Patented June 18, 1940

2,205,070

UNITED STATES PATENT OFFICE 2,205,070

VULCANIZATION OF RUBBER

Winfield Scott, Akron, Ohio, assignor to Wingfoot Corporation, Wilmington, Del., a corporation of Delaware No Drawing. Application September 1, 1936, Serial No. 98,901

21 Claims. (Cl. 260—785)

This invention relates to new compositions of matter which have been found to be valuable accelerators of rubber vulcanization. It includes the process of vulcanizing rubber in their presence and the rubber so treated. The new compositions are thiazyl 2-selenide compounds and contain the grouping

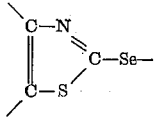

The mercaptothiazoles and derivatives thereof are known to be accelerators of vulcanization. Mercaptobenzothiazole and dibenzothiazyl disulphide are two members of a class which have been used extensively. Heretofore it has been considered that only those derivatives of the benzothiazoles having a mercaptan grouping or sulphur attached to the 2-carbon atom of the thiazole ring are active as accelerators of rubber vulcanization. Illustrative of such compounds are 2-mercaptobenzothiazole itself and various derivatives made from 2-mercaptobenzothiazole in which the hydrogen of the mercaptan group has been replaced by another radical or group. Those compounds such as benzothiazole and 2-amino benzothiazole are not accelerators of vulcanization. 2-amino benzothiazole does have feeble basic properties and on this account it has some activating effect on accelerators of the mercaptan and dithio acid types, but it itself has practically no value as an accelerator.

This invention involves the discoveries of the thiazyl 2-selenide compounds and of their use in the vulcanization of rubber. It has been found that they are excellent accelerators and, surprisingly, are more active accelerators than the corresponding thiazyl 2-sulphides.

Illustrative of the compounds of the invention is the following formula

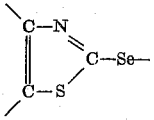

Attached to the open bonds of the adjacent carbon atoms of the thiazole ring may be hydrogen or aliphatic or aromatic radicals. Preferably, however, these two adjacent carbon atoms form part of an arylene radical, such as phenylene, nitro phenylene and naphthylene radicals. Attached to the open bond of the selenium may be hydrogen or any organic or inorganic radical, such as salt- or ester-forming radicals. These compounds are such that by hydrolysis, double decomposition, rearrangement, or by the application of heat, they are capable of forming the selenol compound or its diselenide.

Illustrative of such compounds are the selenol thiazoles, such as 2-selenol benzothiazole; the dithiazyl selenides, such as di(benzothiazyl) di selenide and di(benzothiazyl) mono selenide; the metal salts of the 2-selenol thiazoles, such as the zinc, lead, cadmium, mercury, calcium, sodium, potassium and barium salts of 2-selenol benzothiazole; the reaction products of alkali metal salts of the selenol thiazoles with chlorinated organic compounds, such as the reaction products of sodium benzothiazyl selenide with the ortho nitro chlor benzenes, with the aromatic acyl halides, with the furoyl and tetrahydro furoyl halides, with the chlorinated ketones, with the mono and dichlor acetamides, with chlor benzothiazole, etc. Other illustrative compositions of the invention are the reaction products of 2-selenol benzothiazole with formaldehyde, with amines, with the guanidines such as diphenylguanidine and diortho tolyl guanidine, and with aldehyde amines such as ethylidene-aniline, crotonylidene aniline and hexamethylene tetra-amine, and other reaction products of the 2-selenol thiazoles with organic materials in which the compositions of the reaction products are unknown. These examples indicate only a few of the compounds of the invention as will be apparent from the following description.

The preparation of the compositions of the invention is illustrated in the following examples. All those with, of course, the exception of the 2-selenol thiazoles may be prepared by reacting the selenol thiazole or soluble salt thereof with the desired ingredient or ingredients, the processes being similar to those involved in preparing the corresponding derivatives of the 2-mercapto-thiazoles.

Illustrative but not limitative of the invention are the following examples:

Example 1

2-selenol benzothiazole is conveniently prepared by the action of sodium selenide or hydro selenide on 2-chlor benzothiazole, the yields being practically quantitative. Thus, 0.4 mol of sodium hydroxide is dissolved in 500 cc. of water (more or less water may be used as the strength of the solution is not critical) and the solution is saturated with hydrogen selenide to form a solution of sodium hydro selenide. When no more gas is absorbed, the charging of the hydrogen selenide is discontinued and 0.4 mol of caustic soda is added. This gives a solution containing 0.4 mol of normal sodium selenide (Na₂Se). It has been found preferable to make the sodium selenide solution in the absence of air, for example, by running hydrogen or nitrogen into the reactor with the hydrogen selenide, as the selenide is somewhat easily oxidized with the liberation of free selenium. To this solution of sodium selenide are added 67.8 parts (0.4 mol) of 2-chlor benzothiazole and with rapid stirring the reaction mixture is then heated to gentle reflux. If desired, the sodium selenide solution may be first heated and the 2-chlor benzothiazole added slowly with efficient stirring. The mixture is maintained at gentle ebullition for a period of from 30 to 45 minutes or until droplets of the 2-chlor benzothiazole disappear in the reflux. The solution then contains the 2-selenol benzothiazole in the form of its sodium salt, the equation for the reaction being as follows:

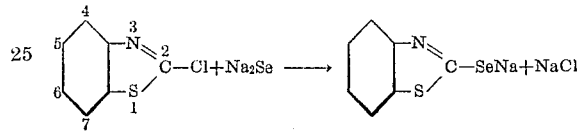

The 2-selenol benzothiazole is then precipitated from the solution of its sodium salt with an acidifying agent such as hydrochloric or sulphuric acid. The product, 2-selenol benzothiazole, is a slightly yellow, crystalline powder which melts with decomposition at 140–143° C.

2-selenol 6-nitro benzothiazole, 2-selenol thiazole and 2-selenol alpha naphthathiazole may be prepared similarly by employing the corresponding 2-chlor thiazole instead of 2-chlor benzothiazole.

*Example 2*

Di(benzothiazyl) di selenide is readily prepared by subjecting 2-selenol benzothiazole to the action of oxidizing agents such as iodine, hydrogen peroxide, ammonium persulphate, etc. In alcohol solution 2-selenol benzothiazole can be oxidized to the di selenide by exposure to atmospheric oxygen. Also, if an alcohol solution of iodine is added to a solution of 2-selenol benzothiazole in alcohol, the di selenide, being quite insoluble in the solvent, precipitates. The di selenide can also be conveniently prepared by the addition of an oxidizing agent such as ammonium persulphate, or of an aqueous solution to which has been added hydrogen peroxide and sulphuric acid, to an aqueous solution of sodium benzothiazyl selenide. The dibenzothiazyl di selenide is a slightly yellow, crystalline powder melting at 169° C.

Other dithiazyl di selenides may be prepared similarly by oxidizing the desired selenol thiazole, examples being di(6-chlor benzothiazyl) di selenide, di(4-methyl benzothiazyl) di selenide, dithiazyl di selenide and di(4-phenyl thiazyl) di selenide.

*Example 3*

Bivalent metal and other metal salts of the 2-selenol thiazoles other than the alkali metal salts are conveniently prepared by adding a solution of a soluble salt of the desired metal to an aqueous solution of an alkali metal salt of the 2-selenol thiazole. Thus, the zinc salt of 2-selenol benzothiazole is prepared by dissolving 25 grams of 2-selenol benzothiazole in 200 cc. of an aqueous solution of caustic soda containing 4.66 grams of sodium hydroxide. To this are added with stirring 100 cc. of an aqueous solution containing 10 grams of zinc chloride. The zinc benzothiazyl 2-selenide precipitates at once and after filtering, washing and drying is obtained as a chloroform soluble, light yellow powder softening at 170° C.

*Example 4*

Lead benzothiazyl 2-selenide is prepared similarly by adding an aqueous solution of lead nitrate or other soluble lead salt to an aqueous solution of sodium benzothiazole 2-selenide, the lead nitrate and the selenide being present in molar proportions. A yellow precipitate of lead benzothiazyl 2-selenide forms at once and upon its removal and purification from the reaction mixture is obtained in the form of a yellow powder which decomposes above 275° C.

*Example 5*

Mercuric benzothiazyl 2-selenide may be prepared by treating an aqueous solution of sodium benzothiazyl 2-selenide containing 15 grams of the selenide with an aqueous solution containing 9.5 grams of mercuric chloride in 150 cc. of water. The mercuric benzothiazyl 2-selenide immediately precipitates and after removal from the reaction mixture and drying is obtained in the form of a flesh-colored powder which melts with decomposition at 178–180° C.

*Example 6*

Cadmium benzothiazyl 2-selenide is prepared similarly by the use of an aqueous solution of cadmium chloride in place of the mercuric chloride in the preceding example. The cadmium benzothiazyl 2-selenide is a yellowish-white powder which decomposes above 285° C.

Other illustrative metal salts are calcium benzothiazyl 2-selenide, zinc thiazyl 2-selenide, lead 4-tolyl thiazyl 2-selenide, barium 7-methoxy benzothiazyl 2-selenide, zinc 3-5-dimethyl thiazyl 2-selenide, zinc AR-tetrahydro beta naphthathiazyl 2-selenide, etc.

*Example 7*

The piperidine salt of 2-selenol benzothiazole is prepared by suspending 15 grams of 2-selenol benzothiazole in 50 cc. of ether and adding thereto 6 grams of piperidine. The salt, which is insoluble in ether, is filtered off and washed with a small amount of fresh ether after which the ether is evaporated. The piperidinium benzothiazyl 2-selenide is obtained in the form of a yellow powder melting at 149–151° C. It analyzed 9.02% nitrogen as compared with the theoretical nitrogen content of 9.36% for piperidinium benzothiazyl 2-selenide. The equation believed to represent the reaction is as follows:

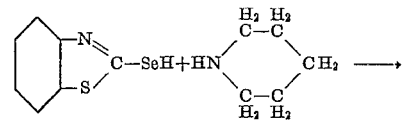

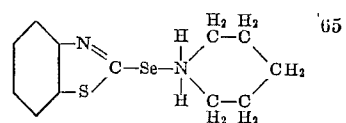

Other amine salts of the 1-selenol thiazoles may be prepared similarly merely by reacting the desired 2-selenol thiazole with the desired amine. Illustrative are the cyclohexyl amine-, ethylene diamine-, diethyl amine-, butyl amine-, dibutyl amine-, tetrahydro alpha furfuryl amine-, diamyl amine-, N-ethyl cyclohexyl amine-, p-phenylene diamine-, dibutyl ethylene diamine-, di iso propyl amine-, and hexahydro phenetidine salts of 2-selenol benzothiazole, 2-selenol 6-ethoxy benzothiazole, and of other 2-selenol thiazoles.

*Example 8*

The diphenylguanidine salt of 2-selenol benzothiazole is prepared by refluxing for a short time an alcoholic solution of equimolar portions of diphenylguanidine and 2-selenol benzothiazole. Upon cooling, the salt crystallizes out in the form of flesh-colored crystals melting at 169–170° C.

Other guanidine salts may be prepared similarly, examples being the dixylyl guanidine, triphenyl guanidine and mono phenyl guanidine salts of 2-selenol benzothiazole and the diortho tolyl guanidine salts of 2-selenol 6-nitro benzothiazole, of 2-selenol benzothiazole and 2-selenol 4-ethoxy benzothiazole.

The ammonia reaction products of the 2-selenol thiazoles are also included in the invention, of which ammonium benzothiazyl 2-selenide and ammonium 4-phenyl benzothiazyl 2-selenide are illustrative. These ammonia, amine and guanidine addition products of the 2-selenol thiazoles may be further reacted with aldehydes to form compositions of unknown structure which are excellent accelerators. Illustrative are the crotonaldehyde reaction product of the reaction product of 2-selenol benzothiazole and hexamethylenetetramine, the acetaldehyde reaction product of butyl ammonium benzothiazyl 2-selenide and the formaldehyde reaction product of the ethylene diamine addition product of 2-selenol benzothiazole.

*Example 9*

An excellent accelerating composition whose structure has as yet not been identified is prepared by reacting two molar proportions of 2-selenol benzothiazole, 2 molar proportions of formaldehyde and 1 molar proportion of urea. Thus, 15 grams of 2-selenol benzothiazole, 6 grams of an aqueous solution containing 36% formaldehyde and 8.4 grams (excess) of urea were placed in 90 cc. of water. To this mixture 20 cc. of a mixture of equal volumes of water and concentrated hydrochloric acid were added. The mixture was heated on a steam bath for a few minutes after which the reaction mixture was filtered and washed with water. The product obtained was 24 grams of a yellow powder melting at 255–255° C.

Similar reaction products may be prepared by substituting for the 2-selenol benzothiazole other 2-selenol thiazoles such as 2-selenol 6-methyl benzothiazole, 2-selenol thiazole, 2-selenol 6-hydroxy benzothiazole, etc.

*Example 10*

To an aqueous or alcoholic solution of sodium benzothiazyl 2-selenide is added a molecular equivalent of 2-4-dinitro chlor benzene and the mixture heated under a reflux condenser until the odor of dinitro chlor benzene disappears. The mixture is then cooled and the 2-4-dinitro phenyl benzothiazyl 2-selenide which precipitates out is removed by filtration, washed free of sodium chloride, dried and ground. It is obtained as a yellow powder melting at 160.5–161.5° C. An analysis for sulphur showed that it contains 8.59% sulphur as compared with the theoretical sulphur content of 8.42% for 2-4-dinitro phenyl benzothiazyl 2-selenide.

Other nitro phenyl benzothiazyl 2-selenides may be prepared by replacing the dinitro chlor benzene with the desired nitro chlor benzene, in which a nitro group should be ortho to the chlorine. Illustrative are 2-6-dinitro 4-chlor phenyl benzothiazyl 2-selenide, 2-4-6-trinitro phenyl benzothiazyl 2-selenide and 2-nitro phenyl benzothiazyl 2-selenide.

*Example 11*

The addition product of zinc benzothiazyl 2-selenide and piperidine is prepared by adding 2.7 grams of piperidine to 14 grams of zinc benzothiazyl 2-selenide in 200 cc. of petroleum ether. A precipitate of zinc piperidinium benzothiazyl 2-selenide forms and after filtering, washing with petroleum ether and drying is obtained in a quantitative yield as a yellow powder.

*Example 12*

A 16.4 gram yield of the addition product of zinc benzothiazyl 2-selenide and cyclohexyl amine was obtained similarly by adding 2.75 grams of cyclohexylamine to a solution of 14 grams of zinc benzothiazyl 2-selenide in 200 cc. of petroleum ether. The product, zinc cyclohexyl ammonium benzothiazyl 2-selenide, is a yellow powder.

*Example 13*

Zinc benzyl ammonium benzothiazyl 2-selenide was prepared similarly by replacing the cyclohexyl amine of the preceding example with 3.4 grams of benzyl amine. The product was 16.2 grams of a yellow powder.

*Example 14*

Zinc diamyl ammonium benzothiazyl 2-selenide, also a yellow powder, was prepared similarly.

Other amines which may be used to form addition products with zinc benzothiazyl 2-selenide are di n-butyl amine, di isopropyl amine, hexahydro phenetidine, hexahydro toluidine, ethylene diamine, tetrahydro alpha furfuryl amine, N-methyl cyclohexyl amine, N-ethyl tetrahydro alpha furfuryl amine, amyl amine, butyl amine, heptyl amine and hexyl amine.

*Example 15*

Fifty parts of 2-selenol benzothiazole were suspended in 500 parts of water and aqueous sodium hydroxide in slight excess of that required to form the sodium benzothiazyl 2-selenide added thereto. When all the 2-selenol benzothiazole had gone into solution, indicating the formation of the soluble sodium salt, an equivalent amount of benzoyl chloride was added and the mixture stirred vigorously until the resulting precipitate became solid. This precipitate was then broken up and allowed to stand for about one half hour, after which the water was filtered off. The yellow precipitate remaining was purified by washing with fresh water and then dissolving in benzene and adding petroleum ether to the solution. The product thus obtained was in the form of yellow crystals melting at 108° C. and is believed to be benzoyl benzothiazyl 2-selenide having the formula

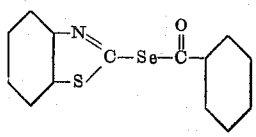

Other compounds of similar nature may be prepared by replacing the benzoyl chloride with another acyl halide, such as furoyl chloride, or an aromatic acyl halide, such as phthaloyl chloride, p-nitro benzoyl chloride, o-methyl benzoyl chloride, p-ethoxy benzoyl chloride and o-methoxy benzoyl chloride.

*Example 16*

Di(benzothiazyl) 2-mono selenide was prepared by refluxing for a period of about two and one half hours a mixture of 21.4 parts by weight of 2-selenol benzothiazole and 17 parts by weight of 2-chlor benzothiazole in 50 parts of carbon bisulphide. Hydrogen chloride gas was given off and, after the cessation of its evolution, the precipitate of di(benzothiazyl) 2-mono selenide was filtered off and purified by crystallizing from a mixture of ethanol and benzene. The purified product melted at 102–103° C., and, upon analysis, was found to contain 7.93% nitrogen and 18.20% sulphur as compared with the theoretical nitrogen and sulphur contents for di(benzothiazyl) 2-selenide of, respectively, 8.07% and 18.44%. The equation representing the reaction is as follows:

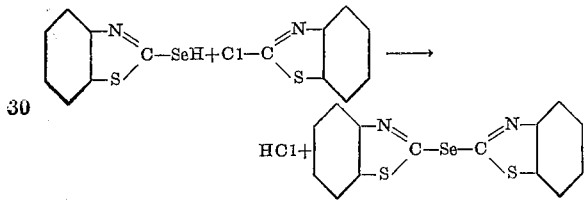

Other di thiazyl mono selenides may be prepared similarly by employing other 2-selenol thiazoles and other 2-chlor thiazoles. Illustrative are di(6-nitro benzothiazyl) 2-senenide, 6-nitro benzothiazyl benzothiazyl 2-selenide, di 4-methyl benzothiazyl) 2-selenide, etc.

*Example 17*

Further illustrative of the invention is the class of thiazyl selenide compounds prepared by reacting at room temperature, or slightly higher, a 2-selenol thiazole, formaldehyde and a secondary amine or a primary aromatic amine. In the reaction water is split out, the methylene group of the formaldehyde linking the thiazyl selenide group and the amino radical to form compounds which may be called amino methylene thiazyl selenides. In one embodiment of this class, 8.5 parts of a 36% aqueous formaldehyde solution were added to 21.4 parts of 2-selenol benzothiazole in 50 volumes of ethyl alcohol. To this mixture were added with stirring 8.5 parts of piperidine. The reaction is exothermic, an orange-yellow solid forming at once. After purifying, this solid melted at 132–134° C. It is believed to possess one of the two formulae

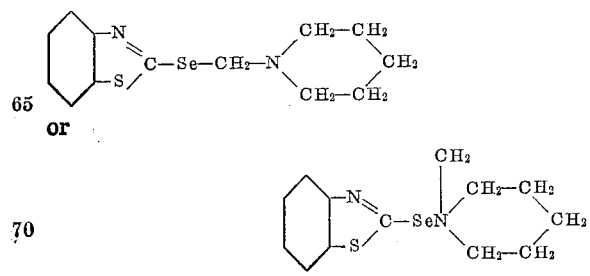

and may be called pentamethylene amino methylene benzothiazyl selenide.

Similar accelerators may be prepared by replacing the piperidine or the 2-selenol benzothiazole with another secondary amine or another 2-selenol thiazole. Exemplary are di-n-butyl amino-, diethyl amino-, diamyl amino-, diphenyl amino-, dibenzyl amino-, N-ethyl cyclohexyl amino-, oxy tetramethylene amino-, and phenyl beta naphthyl amino methylene benzothiazyl 2-selenides.

*Example 18*

Phenyl amino methylene benzothiazyl 2-selenide, believed to have the formula

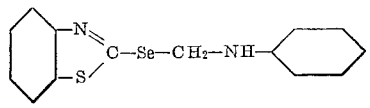

is prepared by suspending 21.4 grams of 2-selenol benzothiazole in 50 cc. of ethyl alcohol and adding thereto 8.4 grams of an aqueous 36% formaldehyde solution. To this were added with stirring 9.3 grams of aniline. The mixture was then warmed for 10–15 minutes, after which the resulting precipitate was filtered and dried. It was a yellow crystalline solid and melted at 94–97° C.

Corresponding products can be prepared by replacing the aniline with other primary aromatic amines, such as ortho toluidine, para toluidine, the ortho and para phenetidines and the alpha and beta naphthylamines. Similarly, the nitroso derivatives may be made by adding gaseous ethyl nitrite to a benzene solution of these aryl amino methylene benzothiazyl 2-selenides cooled to a temperature of about 10° C.

Many other compounds of the invention may be prepared similarly by replacing the 2-4-dinitro chlor benzene of Example 10 with the desired halogenated compound. Illustrative are the reaction product of sodium benzothiazyl 2-selenide and mono chlor acetone, and the reaction product of one mol of asymmetrical dichlor acetone and two mols of sodium benzothiazyl 2-selenide. In like manner a benzothiazyl 2-selenide reaction product of the invention is prepared by reacting in aqueous solution two molar proportions of sodium benzothiazyl 2-selenide with one mol of benzal chloride. Other accelerators of the invention may be prepared by reacting ortho nitro phenyl sulphur halides with sodium benzothiazyl 2-selenides in aqueous solution. Illustrative are the reaction product of 2-benzoyl 4-nitro phenyl sulphur bromide and sodium benzothiazyl 2-selenide and the reaction product of 2-nitro phenyl sulphur chloride and sodium benzothiazyl 2-selenide.

Further illustrative of the invention are the accelerators prepared by reacting in alcoholic solution sodium thiazyl 2-selenides and aryl seleno halides, such as the reaction product of o-nitro phenyl seleno chloride and sodium benzothiazyl 2-selenide and the reaction product of phenyl seleno chloride and sodium benzothiazyl 2-selenide. Still other accelerators of the invention are the reaction products prepared by reacting in alcoholic solution 2-chlor quinoline with, respectively, sodium benzothiazyl 2-selenide and sodium 5-nitro benzothiazyl 2-selenide.

Another composition of the invention is that product believed to be a substituted ammonium salt of 2-selenol benzothiazole, which is prepared by reacting in aqueous solution equimolar proportions of sodium benzothiazyl 2-selenide and the benzyl chloride addition product of hexamethylene tetramine. Dibenzothiazyl diseleno carbonate is prepared similarly by reacting in aqueous solution or in benzene solution two molar proportions of sodium benzothiazyl 2-selenide and one molar proportion of carbonyl chloride, the reaction preferably being carried out at a temperature below about 10° C. The thiophosgene derivatives of the 2-selenol benzothiazoles may be prepared similarly.

Quaternary ammonium halides react with alkali metal benzothiazyl 2-selenides to form accelerators of the invention. Thus, upon the addition of sodium benzothiazyl 2-selenide to a hot benzene solution of hexa decyl pyridinium chloride and refluxing the reaction mixture for several hours, the reaction product of hexa decyl pyridinium chloride and sodium benzothiazyl 2-selenide is obtained. By replacing this quaternary ammonium halide with hexa decyl trimethyl ammonium bromide, with benzyl trimethyl ammonium chloride, with benzyl pyridine ammonium chloride, with beta hydroxy ethyl pyridine chloride, the corresponding benzothiazyl 2-selenides are obtained.

Other compounds of the invention are the reaction product of N-chloro piperidine with sodium benzothiazyl 2-selenide, the reaction product of N-chloro morpholine with sodium benzothiazyl 2-selenide, and the corresponding reaction products in which dimethyl chlor amine and dibutyl chlor amine are substituted for the N-chloro piperidine and N-chloro morpholine.

Other reaction products of chlorinated compounds with sodium benzothiazyl selenides are the reaction products of mono and dichlor aceto phenone with sodium benzothiazyl 2-selenide, the reaction product of diphenyl carbamine chloride with sodium benzothiazyl 2-selenide, and the reaction products of imino methylene dichlorides and dichlor di-imides with these selenides. Another acelerator of the invention is the product prepared by reacting acetyl chloride on benzothiazyl 2-seleno methylene hydrin.

Still other illustrative examples of the invention are the reaction products of formaldehyde with the 2-selenol thiazoles, such as benzothiazyl 2-seleno methylene hydrin and 7-ethoxy benzothiazyl 2-seleno methylene hydrin. Still other compositions of the invention are the reaction products of methylol guanidines with the 2-selenol thiazoles, illustrative of which is the reaction product of 2-selenol benzothiazole with the reaction product of diphenylguanidine and formaldehyde. Other compositions are the reaction products of the 2-selenol thiazoles with methylol amides. Thus, formaldehyde is reacted with acetamide or benzamide or other amide in molar proportions and the product then mixed with a mol of 2-selenol benzothiazole and the product heated until water is split out.

The products of the invention have been found to be excellent accelerators of the vulcanization of rubber, being quite active at relatively low temperatures. Illustrative of two formulae in which the products of the invention have been found satisfactory are the following:

Formula A

| | Parts by weight |
|---|---|
| Smoked sheet rubber | 100 |
| Zinc oxide | 5 |
| Sulphur | 3 |
| Accelerator | As indicated |

Formula B

| | Parts by weight |
|---|---|
| Smoked sheet rubber | 100 |
| Zinc oxide | 5 |
| Sulphur | 3 |
| Titanium oxide | 10 |
| Diphenylguanidine | 0.15 |
| Accelerator | 0.35 |

Results obtained by the use of these formulae are as follows, the figures given being those for the optimum cure in the range tested as determined by hand tests. Also, tests are included showing the comparative action of the accelerators with three corresponding accelerators of the 2-mercaptothiazole type.

| Accelerator | Amt., pts. by wt. | Cure in mins., °F. | Ult. tens. kgs./cm.$^2$ | Max. elg., percent | Kgs./cm.$^2$ @ 500% | Kgs./cm.$^2$ @ 700% | Formula |
|---|---|---|---|---|---|---|---|
| 2-mercaptobenzothiazole | .50 | 40/260 | 130 | 840 | 17 | 57 | A |
| 2-selenol benzothiazole | .50 | 20/260 | 162 | 775 | 27 | 105 | A |
| Dibenzothiazyl disulfide | .50 | 40/275 | 110 | 800 | 19 | 60 | A |
| Dibenzothiazyl diselenide | .50 | 30/275 | 146 | 760 | 26 | 101 | A |
| Zinc benzothiazyl 2-mercaptide | .65 | 60/260 | 125 | 840 | 17 | 53 | A |
| Zinc benzothiazyl 2-selenide | .65 | 20/260 | 158 | 820 | 21 | 79 | A |
| Piperidinium benzothiazyl 2-selenide | .50 | 30/240 | 145 | 750 | 27 | 104 | A |
| Lead benzothiazyl 2-selenide | .50 | 60/240 | 132 | 830 | 18 | 64 | A |
| Mercuric benzothiazyl 2-selenide | .50 | 80/240 | 146 | 820 | 20 | 72 | A |
| Cadmium benzothiazyl 2-selenide | .50 | 80/285 | 106 | 850 | 15 | 45 | A |
| Product of Example 9 | .35 | 30/260 | 174 | 725 | 43 | 158 | B |
| 2-4-dinitrophenyl benzothiazyl 2-selenide | .50 | | | | | | |
| Diphenylguanidine | .20 | 30/260 | 188 | 770 | 31 | 127 | A |
| 2-4-dinitrophenyl benzothiazyl 2-sulphide | .50 | | | | | | |
| Diphenylguanidine | .20 | 30/260 | 155 | 800 | 22 | 85 | A |
| Addition product of piperidine and zinc benzothiazyl 2-selenide | .30 | 80/240 | 176 | 775 | 27 | 112 | A |
| Addition product of cyclohexylamine and zinc benzothiazyl 2-selenide | .30 | 60/240 | 134 | 790 | 20 | 79 | A |
| Addition product of benzylamine and zinc benzothiazyl 2-selenide | .30 | 80/240 | 170 | 815 | 22 | 86 | A |
| Addition product of monoamyl amine and zinc benzothiazyl 2-selenide | .30 | 40/240 | 128 | 830 | 17 | 58 | A |
| Addition product of diamyl amine and zinc benzothiazyl 2-selenide | .30 | 60/260 | 122 | 730 | 26 | 99 | A |

It will be observed that the 2-selenol thiazoles and their derivatives are considerably more powerful accelerators than mercaptobenzothiazole and its corresponding derivatives. They cause the vulcanization of rubber in much shorter times and also provide a stiffer, snappier cure as is shown by the much higher tensile figures at 500% and 700% than those for the corresponding thiazyl sulphide compounds. With some of the thiazyl 2-selenide compounds it will be found that their use in conjunction with basic nitrogen-containing activating accelerators is very satisfactory; e. g., with the dibenzothiazyl monoselenides. Many of the thiazyl 2-selenide compounds, however, are sufficiently active in and of themselves that activation by a basic compound is neither necessary nor desirable.

It will be understood that, while 2-selenol benzothiazole and its derivatives have been used principally in describing the invention, the invention is not limited thereto but includes the class of 2-selenol thiazoles and derivatives thereof broadly. Illustrative of the 2-selenol thiazoles are 2-selenol thiazole, 2-selenol 6-tertiary butyl benzothiazole, 4-5-dimethyl 2-selenol thiazole, 2-selenol 6-tertiary amyl benzothiazole, 4-phenyl 2-selenol thiazole, 2-selenol 6-oxyphenyl benzothiazole, 4-5-di-p-anisyl 2-selenol thiazole, 4-5-diphenyl 2-selenol thiazole, 2-selenol 5-nitro benzothiazole, 5, 6 or 7-methyl 2-selenol benzothiazoles, 2-selenol 4-6-dimethyl benzothiazole, 5, 6 or 7-methoxy 2-selenol benzothiazoles, 2-selenol 5- or 6-chlor benzothiazole, 5, 6 or 7-hydroxy 2-selenol benzothiazoles, 2-selenol 5- or 6-amino benzothiazole, 2-selenol AR-tetrahydro alpha naphthathiazole, 2-selenol alpha or beta naphthathiazole, 2-selenol 6-phenyl amino benzothiazole, etc. Of these the 2-selenol thiazoles of the benzene and naphthalene series are preferred.

From the foregoing description it will be apparent that an invention of generic scope is provided, the class of thiazyl 2-selenide compounds having been discovered and having been found excellent accelerators of the vulcanization of rubber. It is to be understood that by the expressions "thiazyl 2-selenide compounds" and "benzothiazyl 2-selenide compounds", it is intended to include compounds and products embodying a thiazyl or benzothiazyl radical, as the case may be, with a selenium atom attached to the mu carbon atom of the thiazole ring. While various embodiments of the invention have been described in detail, it will be understood that the invention is not so limited but that numerous modifications may be made therein without departing from the spirit of the invention or from the scope of the appended claims, wherein it is intended to cover all features of patentable novelty residing in the invention.

What I claim is:

1. The process of vulcanizing rubber which comprises subjecting rubber to vulcanization in the presence of an aryl thiazyl 2-selenide compound.

2. The process of vulcanizing rubber which comprises subjecting rubber to vulcanization in the presence of a benzothiazyl 2-selenide compound.

3. The process of vulcanizing rubber which comprises subjecting rubber to vulcanization in the presence of a thiazyl 2-selenide compound.

4. The process of vulcanizing rubber which comprises subjecting rubber to vulcanization in the presence of 2-selenol benzothiazole.

5. The process of vulcanizing rubber which comprises subjecting rubber to vulcanization in the presence of di(benzothiazyl) diselenide.

6. The process of vulcanizing rubber which comprises subjecting rubber to vulcanization in the presence of zinc benzothiazyl 2-selenide.

7. The process of vulcanizing rubber which comprises subjecting rubber to vulcanization in the presence of a bivalent metal salt of 2-selenol benzothiazole.

8. The process of vulcanizing rubber which comprises subjecting rubber to vulcanization in the presence of a metal salt of 2-selenol benzothiazole.

9. The process of vulcanizing rubber which comprises subjecting rubber to vulcanization in the presence of a 2-selenol aryl thiazole.

10. The process of vulcanizing rubber which comprises subjecting rubber to vulcanization in the presence of a di(aryl thiazole) selenide.

11. The process of vulcanizing rubber which comprises subjecting rubber to vulcanization in the presence of a metal salt of a 2-selenol aryl thiazole.

12. The process of vulcanizing rubber which comprises subjecting rubber to vulcanization in the presence of a composition containing the grouping

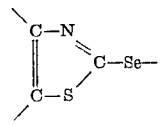

wherein the two adjacent carbon atoms of the thiazole ring are part of an arylene radical.

13. The vulcanizates prepared according to the process of claim 3.

14. The vulcanizates prepared according to the process of claim 4.

15. The vulcanizates prepared according to the process of claim 5.

16. The vulcanizates prepared according to the process of claim 6.

17. The process according to claim 3 in which an activating nitrogen-containing accelerator is employed.

18. A benzothiazyl 2-selenide compound.

19. The thiazyl 2-mono selenide compounds.

20. 2-selenol benzothiazole.

21. Zinc benzothiazyl 2-selenide.

WINFIELD SCOTT.